(12) United States Patent
Kharat et al.

(10) Patent No.: US 8,266,636 B2
(45) Date of Patent: Sep. 11, 2012

(54) VIRTUALIZE, CHECKPOINT, AND RESTART SYSTEM V IPC OBJECTS DURING CHECKPOINTING AND RESTARTING OF A SOFTWARE PARTITION

(75) Inventors: Satish Narayan Kharat, Bangalore (IN); Rajeev Mishra, Bangalore (IN); Lance Warren Russell, Rosanky, TX (US); Suresh Sabarathinam, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1016 days.

(21) Appl. No.: 12/242,156

(22) Filed: Sep. 30, 2008

(65) Prior Publication Data

US 2010/0083283 A1    Apr. 1, 2010

(51) Int. Cl.
G06F 3/00       (2006.01)
G06F 9/44       (2006.01)
G06F 9/46       (2006.01)
G06F 13/00      (2006.01)

(52) U.S. Cl. ........................................ 719/319
(58) Field of Classification Search .................... 719/319
See application file for complete search history.

(56) References Cited

U.S. PATENT DOCUMENTS

| | | | |
|---|---|---|---|
| 6,795,966 B1 | 9/2004 | Lim et al. | |
| 6,934,755 B1 | 8/2005 | Saulpaugh et al. | |
| 7,191,440 B2 | 3/2007 | Cota-Robles et al. | |
| 7,191,441 B2 | 3/2007 | Abbott et al. | |
| 2005/0257080 A1 | 11/2005 | Santos et al. | |
| 2005/0268298 A1* | 12/2005 | Hunt et al. | 718/1 |
| 2009/0007147 A1* | 1/2009 | Craft et al. | 719/320 |
| 2009/0157882 A1* | 6/2009 | Kashyap | 709/227 |

OTHER PUBLICATIONS

Oren Laadan, "Transparent Checkpoint-Restart of Multiple Processes on Commodity Operating Systems", 2007, USENIX Annual Technical Conference, pp. 323-336.*

* cited by examiner

*Primary Examiner* — Andy Ho
*Assistant Examiner* — Timothy A Mudrick
(74) *Attorney, Agent, or Firm* — Yee & Associates, P.C.; David A. Mims, Jr.

(57) ABSTRACT

Migrating a workload partition (WPAR) is provided. Responsive to receiving a request to checkpoint the WPAR, a list of virtual identifiers used by the WPAR to refer to IPC objects is generated and stored. Each virtual identifier corresponds to an IPC object and to a real identifier used by a kernel that corresponds to the IPC object. IPC object data and control information is collected and stored. Each process in the WPAR stores per process data. Responsive to receiving a request to restart the WPAR, the virtual identifier that the WPAR wants to be used is registered. A new IPC object is created by a kernel. The kernel maps a real identifier used by the kernel for the new IPC object to the registered virtual identifier. The restart process retrieves IPC data and control information and overlays it on the new IPC object. The per process data is restored.

20 Claims, 9 Drawing Sheets

VIRTUALIZE, CHECKPOINT, AND RESTART SYSTEM V IPC OBJECTS DURING CHECKPOINTING AND RESTARTING OF A SOFTWARE PARTITION

This invention was made with Government support under Contract No. HR0011-07-9-0002 awarded by Defense Advanced Research Projects Agency (DARPA). The government has certain rights in this invention.

BACKGROUND OF THE INVENTION

1. Field of the Invention

The present invention relates generally to a data processing system. More particularly, the present invention is directed to a computer implemented method, system, and computer usable program code for checkpointing and restarting workload partitions.

2. Description of the Related Art

A workload partition (WPAR) is a virtualized operating system environment within a single instance of an operating system. A WPAR is a software partition that provides isolation of software services, applications, and administration by utilizing flexible software-defined boundaries within the single instance of an operating system. There are two types of WPARs, a system WPAR and an application WPAR. System WPARs are virtual system environments that closely resemble a logical partition or a separate system. System WPARs have their own private file systems, users and groups, login, network space, and administrative domain. All system WPARs share the same global kernel. This means each system WPAR will run its own copy of user space programs but share the kernel (operating system) with the rest of the WPARs and the global operating system. User space is not part of a kernel. User space is that portion of system memory in which user processes run. This contrasts with kernel space, which is that portion of memory in which the kernel executes and provides its services. Application programs execute in user space.

A system WPAR can be booted, accessed, and shutdown like a stand-alone data processing system. Application WPARs are lightweight environments used to isolate the execution of one or more application processes. WPAR mobility is an extension to both system and application WPARs that provides the functionality to move an actual running workload from one physical data processing system to another physical data processing system.

Many operating systems that are similar to a UNIX operating system, such as LINUX and UNIX SYSTEM V operating systems, use UNIX SYSTEM V inter-process communication (IPC) objects. Inter-process communication is a set of techniques, often referred to as objects, for exchanging data among two or more threads in one or more processes. UNIX SYSTEM V IPC objects can be one of three kinds of objects: UNIX SYSTEM V message queues, semaphores, and shared memory segments. A semaphore is a protected variable, an entity storing a value, or abstract data type, an entity grouping several variables that may or may not be numerical, that restricts access to shared resources in a multi-programming environment. An IPC semaphore object locks or unlocks shared resources. Message queues provide a way of sending a block of data from one process to another. Different processes can communicate by sending and receiving messages to and from the message queue. Shared memory segments provide an efficient way of directly sharing an address space between multiple processes. UNIX SYSTEM V is a version of a UNIX operating system. UNIX SYSTEM V was first released in 1993. UNIX SYSTEM V IPC objects are referred to throughout the disclosure as IPC objects.

BRIEF SUMMARY OF THE INVENTION

According to one embodiment of the present invention, a workload partition is migrated. Responsive to receiving a request to checkpoint the workload partition on a first data processing system, a checkpoint process generates a list of a set of virtual identifiers used by the workload partition to refer to a set of inter-process communication (IPC) objects, wherein each virtual identifier of the set of virtual identifiers corresponds to an IPC object of the set of IPC objects and to a real identifier used by a kernel that corresponds to the IPC object. The list is stored in a data repository. IPC object data and control information are collected for each IPC object in the list, forming collected data. The collected data is stored in the data repository. Each process in the workload partition stores per process data in the data repository. Responsive to receiving a request to restart the workload partition on a second data processing system, a restart process registers the virtual identifier stored in the data repository that the workload partition wants to be used for a new IPC object to be created on the second data processing system to form a registered virtual identifier. The new IPC object is created by a kernel on the second data processing system. The kernel maps a real identifier used by the kernel associated with the new IPC object to the registered virtual identifier. The restart process retrieves the collected data associated with the registered virtual identifier from the data repository. The collected data is overlaid on the new IPC object. Per process data for each process in the workload partition is restored from the data repository.

DETAILED DESCRIPTION OF THE INVENTION

Figure 1:
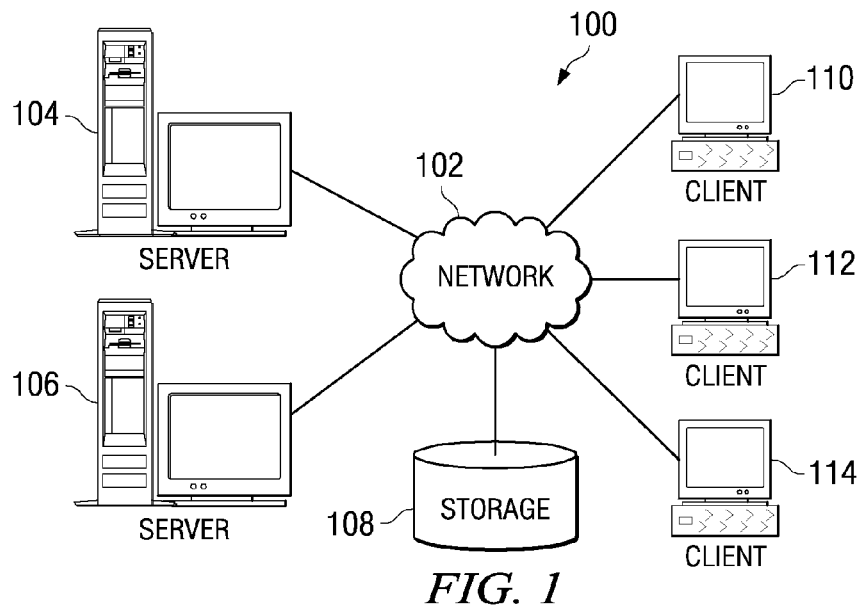
FIG. 1 depicts a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit, " "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
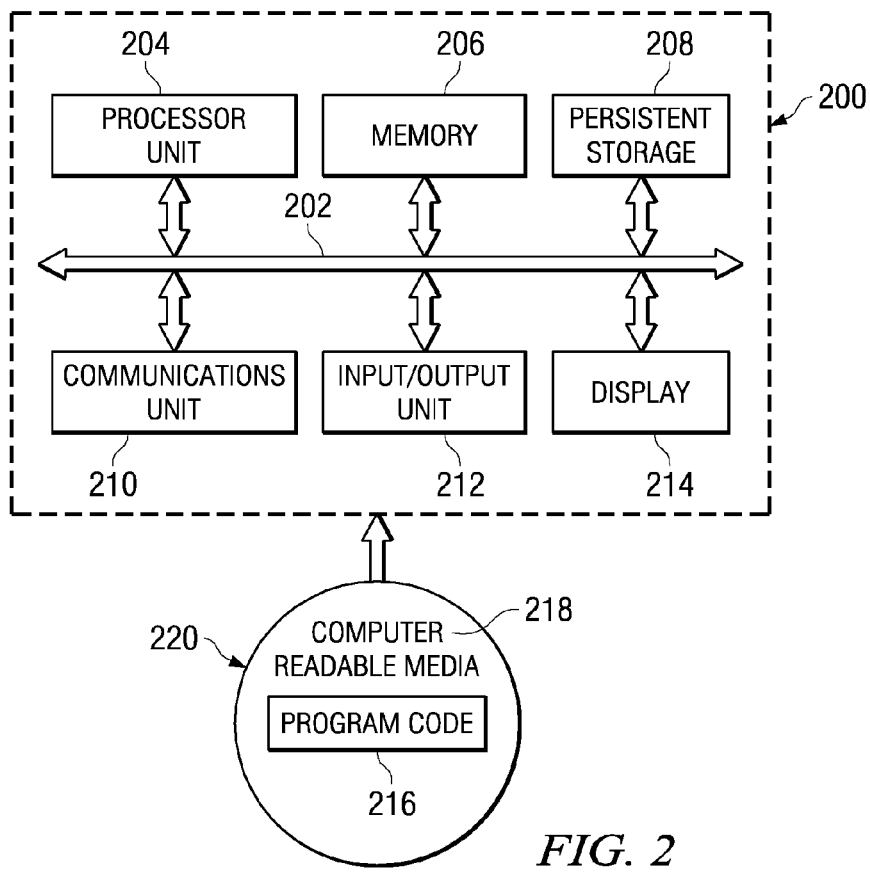
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

WPARs can be moved and restarted on the same or a different data processing system. In order to move and restart a running WPAR, the running WPAR must be checkpointed and restarted. Checkpointing means saving a "snapshot" of the state of a current application state, such as the state of a running WPAR, for use in restarting the application. Restarting means restoring the saved snapshot on the same or a different data processing system. Successful checkpoint and restart of a running WPARS that uses IPC objects requires that the IPC objects used by the running WPAR should be checkpointed and restarted as well. In order for the checkpoint and restart of a WPAR to be transparent, after the restart the application/programs in the WPAR should be able to continue working with the IPC objects created before the checkpoint. Transparent means that the application program is not aware of the checkpoint and restart process.

Exemplary embodiments provide for virtualizing, checkpointing, and restarting IPC objects in order to enable checkpointing and restarting of a WPAR. Exemplary embodiments satisfy the following four constraints: (1) for a WPAR that undergoes a checkpoint and is restarted later on the same or a different data processing system, the IPC objects present in the WPAR at the time of checkpoint of the WPAR should remain valid after the restart of the WPAR; (2) the applications in the WPAR should be able to use the IPC objects after the restart of the WPAR the same way the applications used the IPC objects before the checkpoint of the WPAR; (3) the attributes, such as access modes, the user identity of the creator, the user identity of the owner, and the state, such as the semaphore state, messages in the message queue, and so forth of the IPC object, must be preserved across the checkpoint-restart cycle; and (4) the programs/applications running inside the WPAR need not be aware of the checkpoint and restart process.

Take the case where an application that is part of a WPAR running on system A is using a semaphore object, which is a type of IPC object that has an IPC object identifier (IPC ID) of "100." When the WPAR is checkpointed and restarted on system B, the IPC ID "100" may already be in use on system B. This is because IPC IDs are assigned on a per system basis. Thus, during the restart of a WPAR, the WPAR may not be able to continue to use all the IPC IDs that the WPAR had previously been using before the WPAR was checkpointed.

Exemplary embodiments overcome this problem by virtualizing the IPC IDs. By virtualizing the IPC IDs and associating WPAR IDs with the virtual IPC IDs, exemplary embodiments allow applications within a WPAR to continue using IPC IDs after restarting the WPAR that the applications were using at the time of checkpointing the WPAR. Exemplary embodiments decouple the IPC IDs returned to the user space during the creation of the IPC object from the IPC IDs that are used by the operating system kernel. Associating WPAR IDs with the virtual IPC ID makes the virtual IPC ID space WPAR wide instead of the earlier system wide. The veal IPC ID space, however, still remains system wide. Thus, we can have the same virtual IPC ID in different WPARs in the same system and they refer to different real IPC IDs and hence different IPC objects.

Thus, in accordance with an exemplary embodiment, the user space uses the virtual IPC ID. When the user space passes the virtual IPC ID as arguments in system calls to the operating system of the kernel, the kernel first converts the virtual IPC ID to the real IPC ID and operates using the real IPC IDs. Then, when the kernel has to return to an IPC ID as part of system call to user space, the kernel converts the real IPC ID to the corresponding virtual IPC ID before returning the IPC ID.

The attributes and the state of the IPC objects are stored in the operating system kernel. Exemplary embodiments provide for retrieving the state and the attributes of the IPC objects from the user space during the checkpoint of a WPAR from user space. Further, exemplary embodiments restore the attributes and state saved during checkpointing the WPAR from user space during the restarting of the WPAR on the new data processing system. WPAR checkpoint and restart is driven from the user space even though most of the data to be collected is in the kernel. This is because the checkpoint operation involves a lot of operation other than collecting or setting data to and from the kernel. IPC checkpoint and restart being part of the larger WPAR checkpoint and restart mechanism is also driven from user space.

Exemplary embodiments ensure that the IPC objects of the WPAR can be used the same way after the restart of a WPAR as the IPC objects were being used at the time of checkpointing the WPAR. Exemplary embodiments provide for retrieving and restoring the state and the attributes of IPC objects from the user space by using new and existing system call application program interfaces (APIs).

Figure 3:
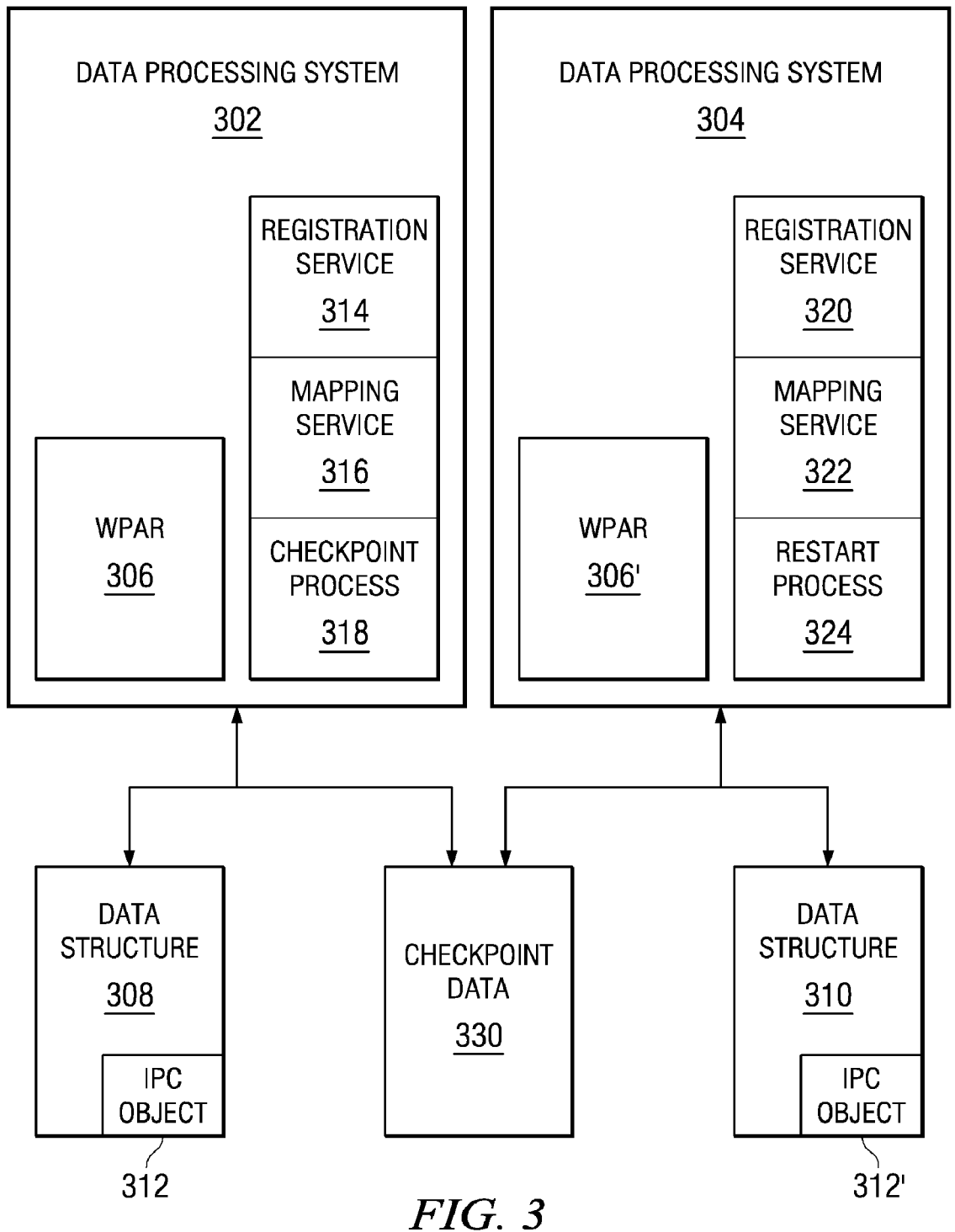
FIG. 3 is a block a diagram of a system for migrating a WPAR in accordance with an exemplary embodiment.

Turning back to the figures, FIG. 3 is a block a diagram of a system for migrating a WPAR in accordance with an exemplary embodiment. System 300 comprises data processing systems 302 and 304, data structures 308 and 310, and IPC object 312. Data processing systems 302 and 304 may be implemented as data processing system 200 in FIG. 2. Data structures 308 and 310 represent a set of IPC data structures. Data structures 308 and 310 may be implemented as any type of data structure, including tables, databases, strings, and so forth, or any combination thereof. Further, a set of data structures may comprise one data structure or multiple data structures. Thus, each workload partition and kernel in a data processing system may have its own individual data structure in data structure 308, or data structure 308 may comprise only one data structure containing all the necessary information, or any combination thereof.

Data processing system 302 comprises registration service 314, mapping service 316, checkpoint process 318, and workload partition, WPAR 306. Data structure 308 comprises the mapping information that maps the virtual IPC ID that WPAR 306 uses for IPC object 312 to IPC object 312 and to the real IPC ID that data processing system 302 uses for IPC object 312. WPAR 306 registers the virtual IPC ID that WPAR 306 uses for IPC object 312 with registration service 314. This information is then stored in a data structure in data structure 308. Data processing system 302 creates a real IPC ID for object 312 and registers it with registration service 314. This information is then stored in a data structure in data structure 308. Mapping service 316 then maps this information together and stores the information in a data structure within data structure 308. Thus, when WPAR wants to access IPC object 312, WPAR 306 issues a request to data processing system 302 using the virtual IPC ID stored in data structure 308. Data processing system 302 refers to data structure 308 and determines the real IPC ID associated with the virtual IPC ID sent by WPAR 306 and uses the real IPC ID to process the request to access IPC object 312.

Checkpoint process 318 checkpoints WPAR 306 so that WPAR 306 may be moved to another data processing system, such as data processing system 304. The moved WPAR 306 is represented by WPAR 306'. When WPAR 306 is move to the new data processing system, WPAR 306' wants to be able to use the same virtual IPC ID to access IPC object 312 that WPAR 306 used in data processing system 302. Thus, when checkpoint process 318 checkpoints WPAR 306, checkpoint process 318 also checkpoints IPC object 312 and captures information from data structure 308, including an identifier that identifies the workload partition, the virtual IPC ID that WPAR 306 uses for IPC object 312 and stores this information in checkpoint data 330. This process is more fully explained in FIGS. 5, and 7-9.

Restart process 324 restarts WPAR 306' on data processing system 304. Restart process 324 retrieves information from checkpoint data 330 and causes WPAR 306' to register the virtual IPC ID that WPAR 306 used for IPC object 312 with registration service 320. Thus, when restart process 324 creates a new IPC object, restart process 324 uses information stored in checkpoint 330 to modify the newly created IPC object to make the newly created IPC object, IPC object 312' appear the same as IPC object 312 and assigns virtual IPC ID that WPAR 306 used for IPC object 312 to be used for IPC object 312'. This information is then stored in a data structure in data structure 310. Mapping service 322 then maps this information together and stores the information in a data structure within data structure 310. This process is more fully described in FIGS. 5 and 10-12.

Thus, when WPAR 306' wants to access IPC object 312, WPAR 306' issues a request to data processing system 304 using the virtual IPC ID stored in data structure 310, which is the same virtual IPC ID that WPAR 306 used when residing in data processing system 302. Data processing system 304 refers to data structure 310 and determines the real IPC ID associated with the virtual IPC ID sent by WPAR 306' and uses the real IPC ID to process the request to access IPC object 312'. Thus WPAR 306' uses the same virtual IPC ID to access IPC object 312' as WPAR 306 used to access IPC object 312 even thought the real IPC ID used by data processing system 304 is not necessarily the same real IPC ID used by data processing system 302.

Figure 4:
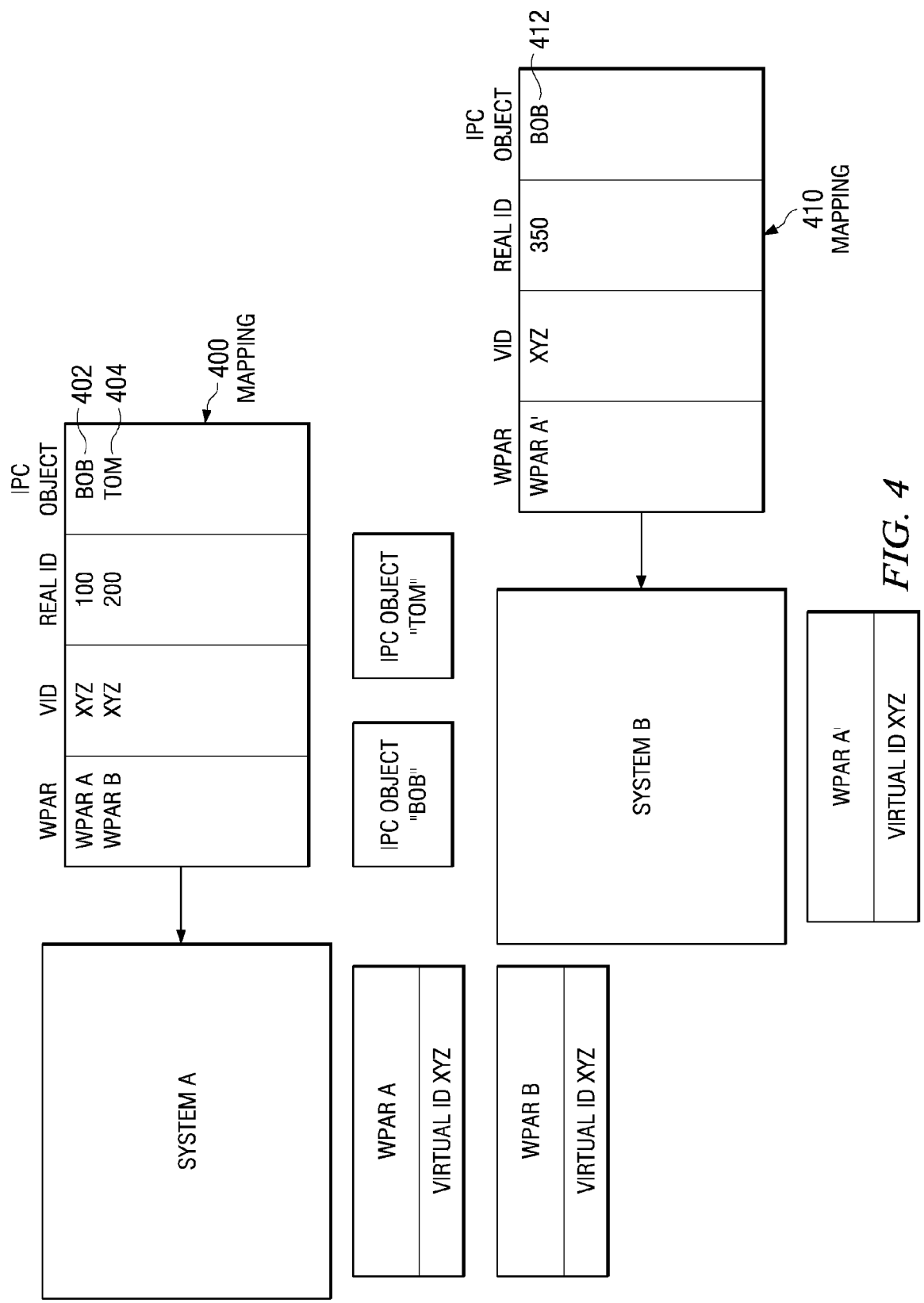
FIG. 4 is a block diagram illustrating a mapping of virtual identifiers in accordance with an exemplary embodiment.

FIG. 4 is a block diagram illustrating a mapping of virtual identifiers in accordance with an exemplary embodiment. Mapping 400 shows the mapping between the virtual identifiers used by WPARs in system A for IPC object to the real identifiers used by system A for the IPC objects. Thus WPAR A and WPAR B are WPARs that are part of system A. As shown, because the virtual identifiers used by each WPAR are mapped to different real identifiers, each WPAR may use the same virtual identifier to refer to different IPC objects. The kernel also associates the WPAR ID with each virtual identifier. This makes the ID space per WPAR. This allows the kernel to distinguish between same virtual identifier s used in different WPARS. These virtual identifiers are then mapped to different real identifiers. Thus, the same virtual IPC ID in different WPARs map to different IPC objects in the kernel. As shown in entry 402 of mapping 400, WPAR A of system A uses virtual identifier XYZ for IPC object BOB and system A uses real identifier 100 to refer to IPC object BOB. Entry 404 shows that WPAR B of system A uses virtual identifier XYZ for IPC object TOM and system A uses real identifier 200 to refer to IPC object TOM. Thus, because system A uses different real identifiers to refer to each IPC object, this allows different WPARs to use the same virtual identifier to refer to different IPC objects.

Entry 412 of mapping 410 shows that WPAR A' uses virtual identity XYZ to refer to IPC object BOB while system B uses real identifier 350 to refer to IPC object BOB. WPAR A' of system B is WPAR A of system A after WPAR has been checkpointed, moved, and restarted on system B. As shown in mapping 410, WPAR A' uses the same virtual identifier, XYZ, in system B as WPAR A used in system A to refer to IPC object BOB even thought systems A and B use different real identifiers to refer to IPC object BOB. IPC object of BOB of system B is not the same IPC object as IPC object BOB of system A. Rather, IPC object of BOB of system B is a new IPC object that a restart process on system created and then modified to appear to be the same as IPC object of system A, when the restart process restarted WPAR A as WPAR A'.

Figure 5:
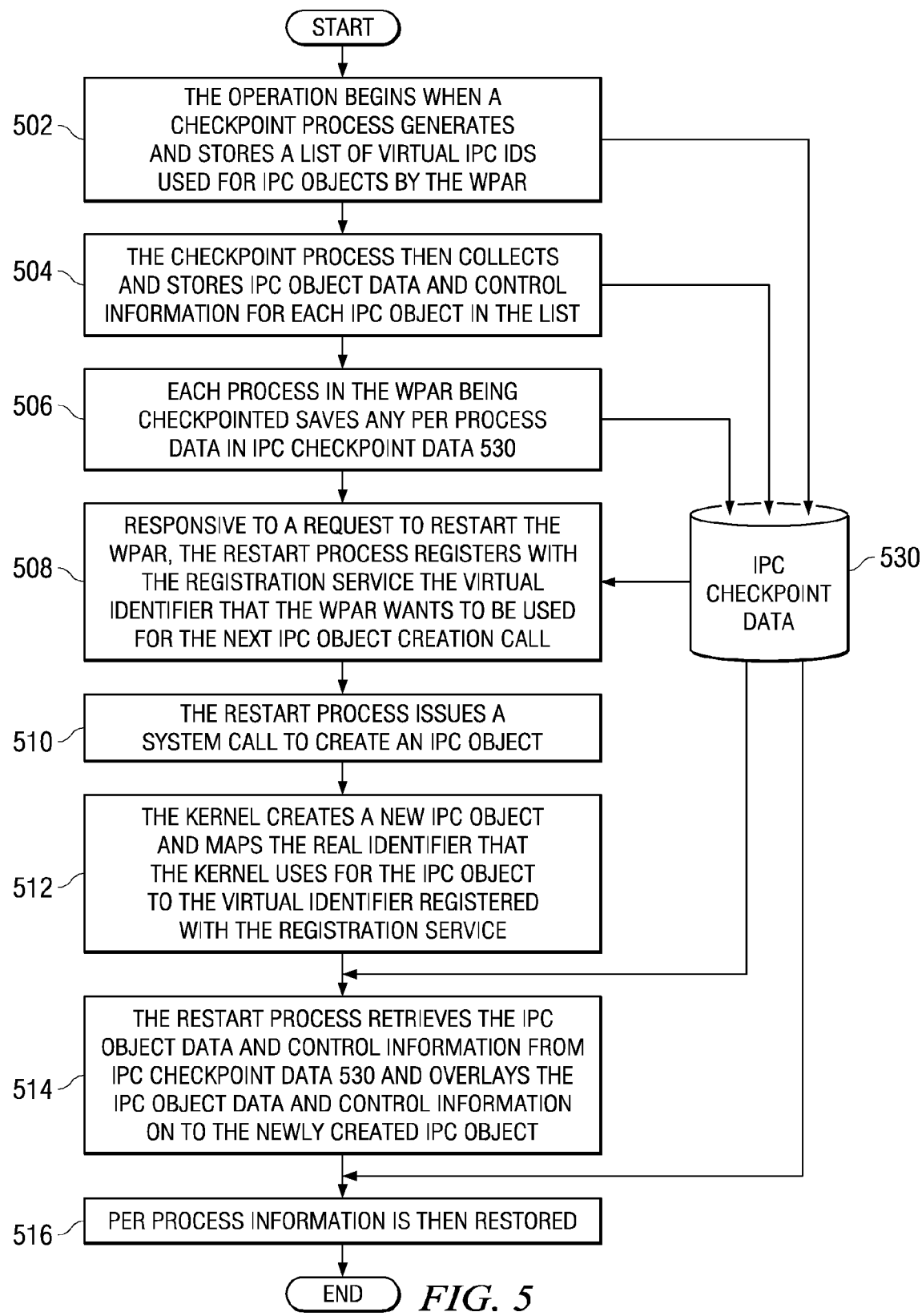
FIG. 5 is flowchart illustrating the operation of migrating a WPAR in accordance with an exemplary embodiment.

FIG. 5 is flowchart illustrating the operation of migrating a WPAR in accordance with an exemplary embodiment. The operation of FIG. 5 may be performed by a checkpoint and restart process, such as checkpoint process 318 and restart process 324 of FIG. 3. IPC checkpoint data 530 may be implemented as checkpoint data 330 of FIG. 3. The operation begins when a checkpoint process generates and stores a list of virtual IPC IDs used for IPC objects by the WPAR (step 502). The checkpoint process then collects and stores IPC object data and control information for each IPC object in the list (step 504). Each process in the WPAR being checkpointed saves any per process data in IPC checkpoint data 530 (step 506).

Thus, responsive to receiving a request to checkpoint the workload partition on a first data processing system, a checkpoint process generates a list of a set of virtual identifiers used by the workload partition to refer to a set of inter-process communication (IPC) objects, wherein each virtual identifier of the set of set of virtual identifiers corresponds to an IPC object of the set of IPC objects and to a real identifier used by a kernel space that corresponds to the IPC object. Therefore, the list is stored in a data repository. IPC object data and control information is collected for each IPC object in the list, forming collected data. The collected data is stored in the data repository. Each process in the workload partition stores per process data in the data repository.

Responsive to a request to restart the WPAR, the restart process registers with the registration service the virtual identifier that the WPAR wants to be used for the next IPC object creation call (step 508). The restart process issues a system call to create an IPC object (step 510). The kernel creates a new IPC object and maps the real identifier that the kernel uses for the IPC object to the virtual identifier registered with the registration service (step 512).

The restart process retrieves the IPC object data and control information from IPC checkpoint data 530 and overlays the IPC object data and control information on to the newly created IPC object (step 514). Per process information is then restored (step 516) and the operation ends. All the information stored in steps 502-506 is stored in IPC checkpoint data 530. All information retrieved in steps 508, 514 and 516 is retrieved from IPC checkpoint data 530.

That is, responsive to receiving a request to restart the workload partition on a second data processing system, a restart process registers the virtual identifier stored in the data repository that the workload partition wants to be used for a new IPC object to be created on the second data processing system to form a registered virtual identifier. The new IPC object is created by a kernel on the second data processing system and the kernel maps a real identifier used by the kernel associated with the new IPC object to the registered virtual identifier. Responsive to receiving a request to restart the workload partition on a second data processing system, a restart process registers the virtual identifier stored in the data repository that the workload partition wants to be used for a new IPC object to be created on the second data processing system to form a registered virtual identifier. The new IPC object is created by a kernel on the second data processing system. The kernel maps a real identifier used by the kernel associated with the new IPC object to the registered virtual identifier. The restart process retrieves the collected data associated with the registered virtual identifier from the data repository. The collected data is overlaid on the new IPC object. Per process data for each process in the workload partition is restored from the data repository.

When a WPAR is being restarted as part of the mobility process, the IPC IDs used by the WPAR need to be recreated in the new destination data processing system. However, some of the IPC IDs used by the WPAR may already be in use by other processes in the destination data processing system. Also, processes keep the IPC ID information in address space and it may not be possible or practical to locate and change the IPC IDs in the address space of all processes using the IPC IDs. Exemplary embodiments virtualize IPC IDs so that the IPC IDs passed to the WPAR are not the same IPC IDs that are used by the operating system kernel. Instead, there is a mapping between a virtual IPC ID returned to the WPAR and the real IPC ID used by the kernel. The mapping is on a per WPAR basis, so each WPAR can use an overlapping set of virtual IPC IDs, but each virtual IPC ID actually gets mapped to a separate real IPC ID inside the operating system kernel.

Virtualization of all three types of IPC objects, semaphore objects, message queue objects, and shared memory objects is performed the same way.

Exemplary embodiments provide for creating a data structure populated with mapping information that maps the virtual IPC ID used by a WPAR to the WPAR and to the real IPC ID used by the kernel operating system and the IPC object itself This data structure may be implemented in many forms, including a database, a table, and a kernel extension.

Figure 6:
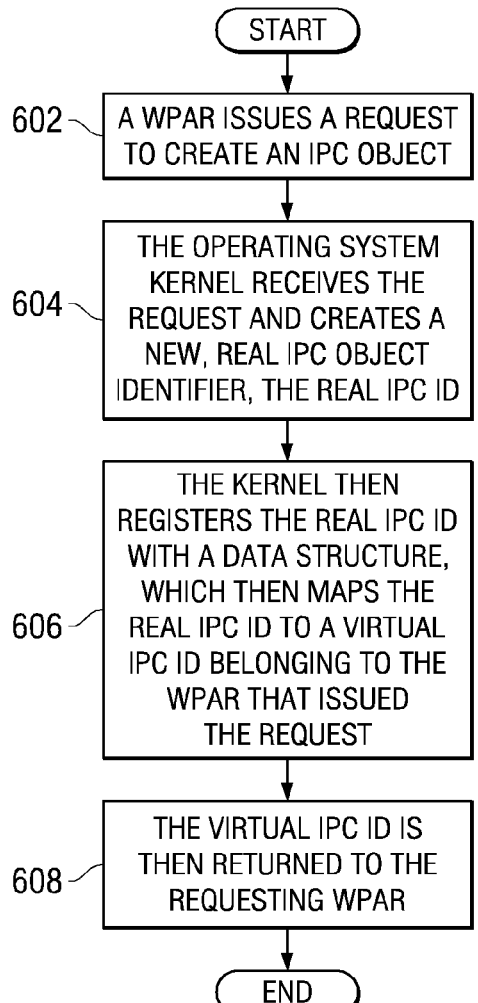
FIG. 6 is a flowchart illustrating the operation of virtualizing an IPC object identifier in accordance with an exemplary embodiment.

FIG. 6 is a flowchart illustrating the operation of virtualizing an IPC object identifier in accordance with an exemplary embodiment. The operation of FIG. 6 may be performed by a WPAR, such as WPAR 302 in FIG. 3. The operation begins when a WPAR issues a request to create an IPC object (step 602). Typically, the WPAR will issue a system call, such as semget( ), to create a new IPC object. The operating system kernel receives the request and creates a new, real IPC object identifier, the real IPC ID (step 604). This real IPC ID is the IPC object identifier that will be used by the kernel. The kernel then registers the real IPC ID with a data structure, which then maps the real IPC ID to a virtual IPC ID belonging to the WPAR that issued the request (step 606). The virtual IPC ID is then returned to the requesting WPAR (step 608) and the process ends.

Figure 7:
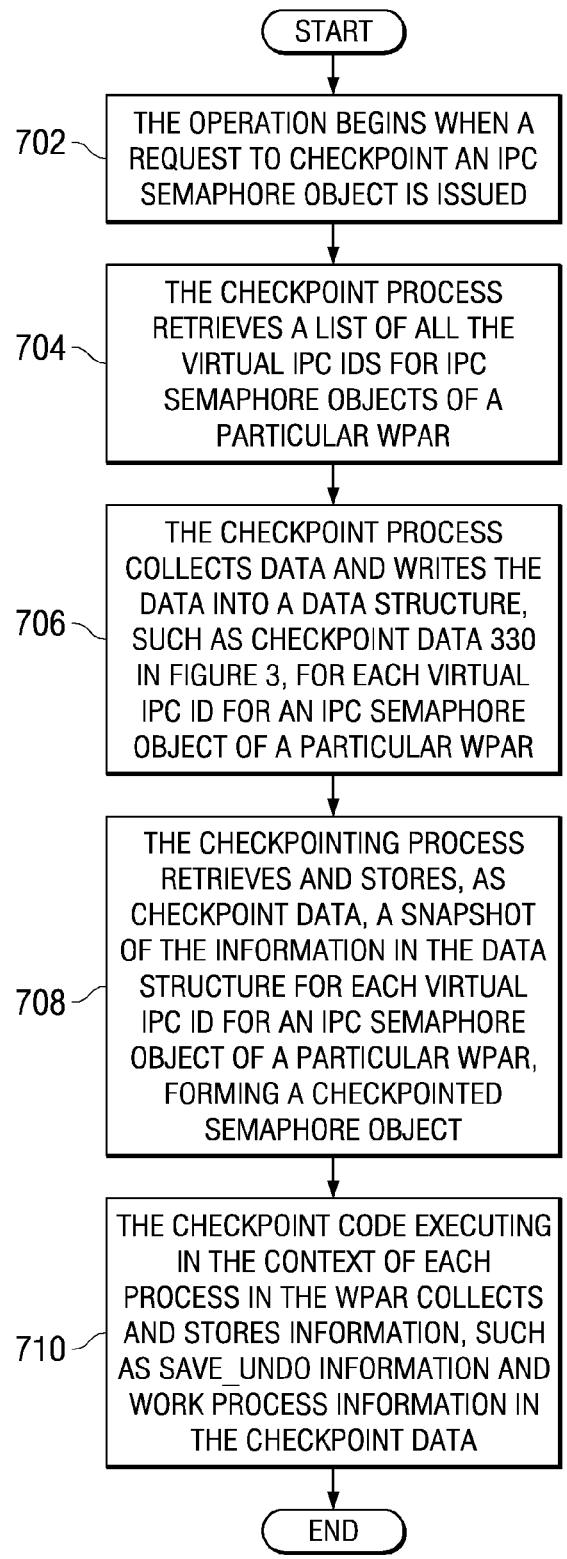
FIG. 7 is flowchart illustrating the operation of checkpointing an IPC semaphore object in accordance with an exemplary embodiment.
Figure 8:
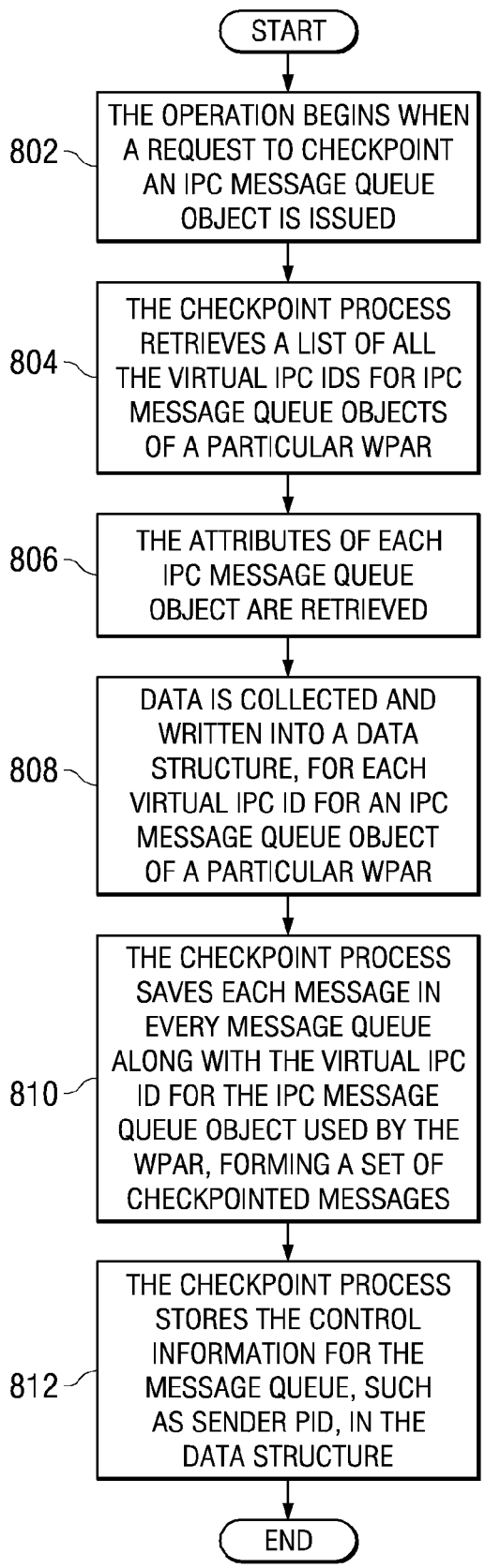
FIG. 8 is flowchart illustrating the operation of checkpointing an IPC message queue object in accordance with an exemplary embodiment.

When a checkpoint operation is initiated, the checkpoint application freezes all processes in the WPAR so that the processes reach a point of execution in the kernel and wait there so that the processes do not change state when the checkpoint is in progress. The checkpoint of the IPC objects occurs at this time. Depending on the type of IPC object being checkpointed, different steps occur. FIGS. 6-8 detail how the checkpoint operation is performed in regards to the three different types of IPC objects. Typically, a checkpoint process invokes a system call to retrieve this information. In one exemplary embodiment, a specific API is created and added to the checkpoint process that the checkpoint process invokes to perform the steps of FIGS. 7-9.

FIG. 7 is flowchart illustrating the operation of checkpointing an IPC semaphore object in accordance with an exemplary embodiment. The operation of FIG. 7 may be performed by a checkpoint process, such as checkpoint process 318 in FIG. 3. FIG. 7 is an expanded view of steps 502-506 of FIG. 5. The operation begins when a request to checkpoint an IPC semaphore object is issued (step 702). The checkpoint process retrieves a list of all the virtual IPC IDs for IPC semaphore objects of a particular WPAR (step 704). The checkpoint process collects data and writes the data into a data structure, such as checkpoint data 330 in FIG. 3, for each virtual IPC ID for an IPC semaphore object of a particular WPAR (step 706). The information in the data structure provides the snapshot of the state of the IPC object associated with the virtual IPC ID. The checkpoint application collects the global IPC data. Besides this collecting of data, there is some data that is specific to the processes using the IPC object. This data is collected by those individual processes. During the checkpoint, the kernel sets up some code from library in the address space of those processes that collect processes specific data.

The data structure contains all the necessary information needed to restore the virtual IPC ID when the WPAR is restarted on a new data processing system. The data structure contains the following information: permissions, such as owner, group, and so forth; number of semaphore variables in the semaphore set; various timestamps; the virtual IPC ID of the semaphore object; an identifier that identifies the WPAR using the virtual IPC ID; and a list of process identifiers for processes that are sleeping on the semaphore, and so forth.

Instead of limiting the semaphore object to use only a single semaphore variable, the standard allows users to create any number of semaphore variables in each semaphore object. These multiple semaphore variables in the semaphore object are referred as a semaphore set. The data structure, typically, is written into a buffer in user space for access by the checkpointing process. The checkpointing process retrieves and stores, as checkpoint data, a snapshot of the information in the data structure for each virtual IPC ID for an IPC semaphore object of a particular WPAR, forming a checkpointed semaphore object (step 708). The checkpoint code executing in the context of each process in the WPAR collects and stores information, such as save_undo information and work process information in the checkpoint data (step 710) and the operation ends. The undo information contains the 'adjust on exit' values of the IPC semaphore variables in the semaphore set, and the virtual IPC ID used by the WPAR for the IPC semaphore object.

FIG. 8 is flowchart illustrating the operation of checkpointing an IPC message queue object in accordance with an exemplary embodiment. The operation of FIG. 8 may be performed by a checkpoint process, such as checkpoint process 318 in FIG. 3. FIG. 8 is expanded view of steps 502-506 of FIG. 5. The operation begins when a request to checkpoint an IPC message queue object is issued (step 802). The checkpoint process retrieves a list of all the virtual IPC IDs for IPC message queue objects of a particular WPAR (step 804). The attributes of each IPC message queue object are retrieved (step 806). Data is collected and written into a data structure, for each virtual IPC ID for an IPC message queue object of a particular WPAR (step 808).

The data structure, such as IPC checkpoint data 530, contains all the necessary information needed to restore the virtual IPC ID when the WPAR is restarted on a new data processing system. The data structure contains the following information: message queue permissions; current number of bytes on the message queue; current number of messages on the message queue; maximum number of bytes allowed on the message queue; process identifier of last process to send a message; process identifier of last process to receive a message; time of last message sent; time of last message received; the virtual IPC ID of the message queue used by the WPAR; and an identifier that identifies the WPAR using the virtual IPC ID. The data structure, typically, is written into a buffer in user space for access by the checkpointing process.

The checkpoint process saves each message in every message queue along with the virtual IPC ID for the IPC message queue object used by the WPAR, forming a set of checkpointed messages (step 810). The checkpoint process stores the control information for the message queue, such as sender PID, in the data structure (step 812) and the operation ends. The following information is collected and stored for each message in the set of checkpointed messages: a time the message was sent; the effective user identification of the author of the message; the effective global identification of the author of the message; the process identifier of the author of the message; a message type; and the text of the message.

Figure 9:
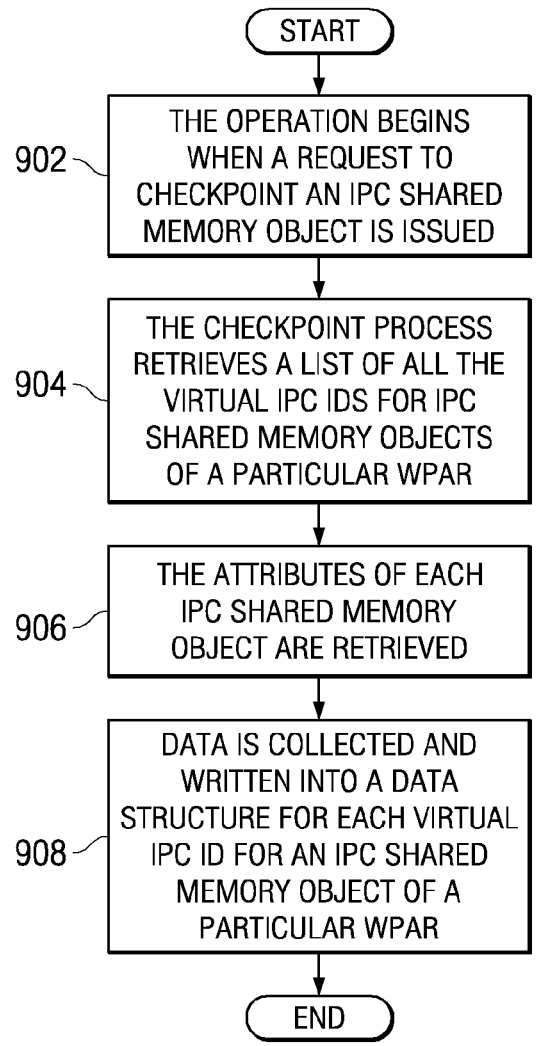
FIG. 9 is flowchart illustrating the operation of checkpointing an IPC shared memory object in accordance with an exemplary embodiment.

FIG. 9 is flowchart illustrating the operation of checkpointing an IPC shared memory object in accordance with an exemplary embodiment. The operation of FIG. 9 may be performed by a checkpoint process, such as checkpoint process 318 in FIG. 3. FIG. 9 is an expanded view of steps 502-506 of FIG. 5. The operation begins when a request to checkpoint an IPC shared memory object is issued (step 902). The checkpoint process retrieves a list of all the virtual IPC IDs for IPC shared memory objects of a particular WPAR (step 904). The attributes of each IPC shared memory object are retrieved (step 906). The checkpoint process saves the full shared memory data (step 908). After the shared memory segment is created by a process, other processes can map that memory into their address space. Now the other processes need not map the whole shared memory area, they can start at some (non zero) offset within that area and map any size until the end of the memory. Thus, processes end up mapping only sections of the shared memory. Data is collected and written into a data structure for each virtual IPC ID for an IPC shared memory object of a particular WPAR (step 910), and the process ends. The information in the data structure provides the snapshot of the state of the IPC object associated with the virtual IPC ID.

The data structure contains all the necessary information needed to restore the virtual IPC ID when the WPAR is restarted on a new data processing system. The data structure contains the following information: size of the shared memory segment; pid of the last shared memory operation; the pid of the creator of the WPAR; current number of attaches to the shared memory; in memory number of attached; last shared memory attachment time; last shared memory detachment time; last time the shared memory was changed; the virtual IPC ID of the IPC shared memory object used by the WPAR; and an identifier that identifies the WPAR using the virtual IPC ID. The data structure, typically, is written into a buffer in user space for access by the checkpointing process. The term pid stands for process identifier and is a numeric value that is uniquely associated with a process in the system. Attach here refers to the operation of configuration done by the process before starting to use the shared memory. The collected data also includes a per process mapping information, such as the location of where the shared memory object is mapped to in the address space of the process, the size of the data mapped, and a start offset in the mapping area.

Figure 10:
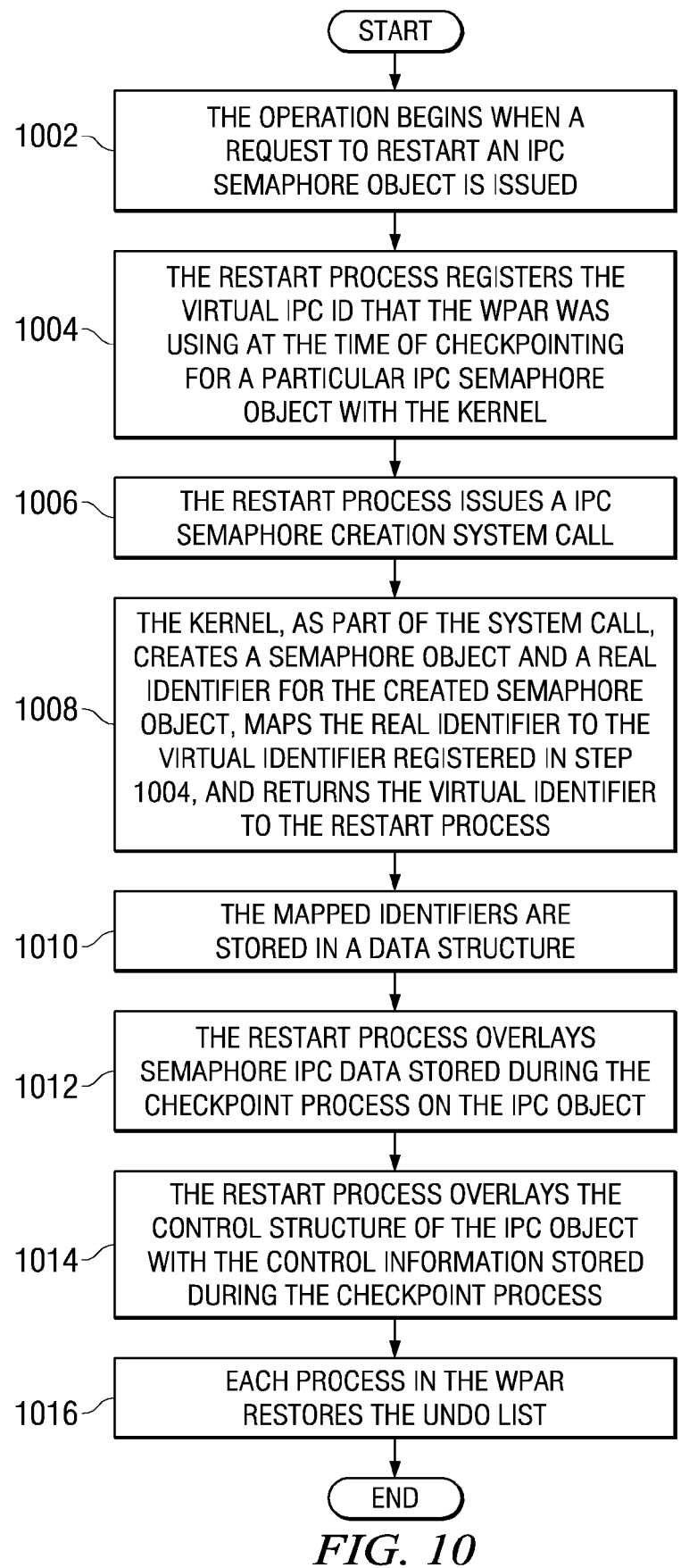
FIG. 10 is flowchart illustrating the operation of restarting an IPC semaphore object in accordance with an exemplary embodiment.

FIG. 10 is a flowchart illustrating the operation of restarting an IPC semaphore object in accordance with an exemplary embodiment. The operation of FIG. 10 may be performed by a restart process, such as restart process 324 in FIG. 3. FIG. 10 is expanded view of steps 508-516 of FIG. 5. The operation begins when a request to restart an IPC semaphore object is issued (step 1002). The restart process registers the virtual IPC ID that the WPAR was using at the time of checkpointing for a particular IPC semaphore object with the kernel (step 1004). The information is retrieved from the checkpoint data that was collected during the checkpoint process. The restart process issues an IPC semaphore creation system call (step 1006). The kernel, as part of the system call, creates a semaphore object and a real identifier for the created semaphore object, maps the real identifier to the virtual identifier registered in step 1004, and returns the virtual identifier to the restart process (step 1008). The mapped identifiers are stored in a data structure (step 1010). The restart process overlays semaphore IPC data stored during the checkpoint process on the IPC object (step 1012). The restart process overlays the control structure of the IPC object with the control information stored during the checkpoint process (step 1014). Each process in the WPAR restores the undo list (step 1016) and the process ends.

Figure 11:
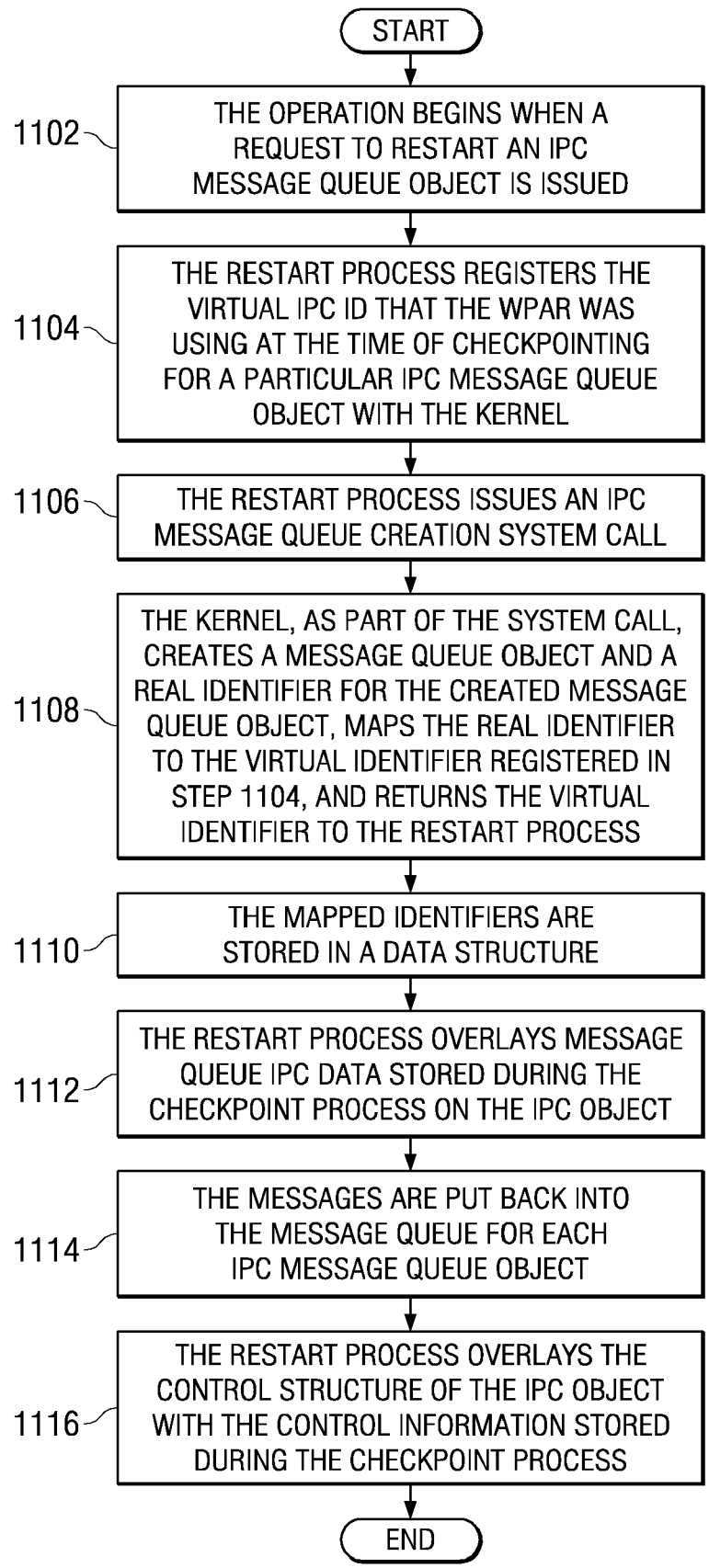
FIG. 11 is flowchart illustrating the operation of restarting an IPC message queue object in accordance with an exemplary embodiment.

FIG. 11 is a flowchart illustrating the operation of restarting an IPC message queue object in accordance with an exemplary embodiment. The operation of FIG. 11 may be performed by a restart process, such as restart process 324 in FIG. 3. FIG. 11 is expanded view of steps 508-516 of FIG. 5. The operation begins when a request to restart an IPC message queue object is issued (step 1102). The restart process registers the virtual IPC ID that the WPAR was using at the time of checkpointing for a particular IPC message queue object with the kernel (step 1104). The information is retrieved from the checkpoint data that was collected during the checkpoint process. The restart process issues an IPC message queue creation system call (step 1106). The kernel, as part of the system call, creates a message queue object and a real identifier for the created message queue object, maps the real identifier to the virtual identifier registered in step 1104, and returns the virtual identifier to the restart process (step 1108). The mapped identifiers are stored in a data structure (step 1110). The restart process overlays message queue IPC data stored during the checkpoint process on the IPC object (step 1112). The messages are put back into the message queue for each IPC message queue object (step 1114). The restart process uses a special kernel API to send messages into respective message queues along with their attributes, such as the sending processes pid. The restart process overlays the control structure of the IPC object with the control information stored during the checkpoint process (step 1116), and the process ends.

Figure 12:
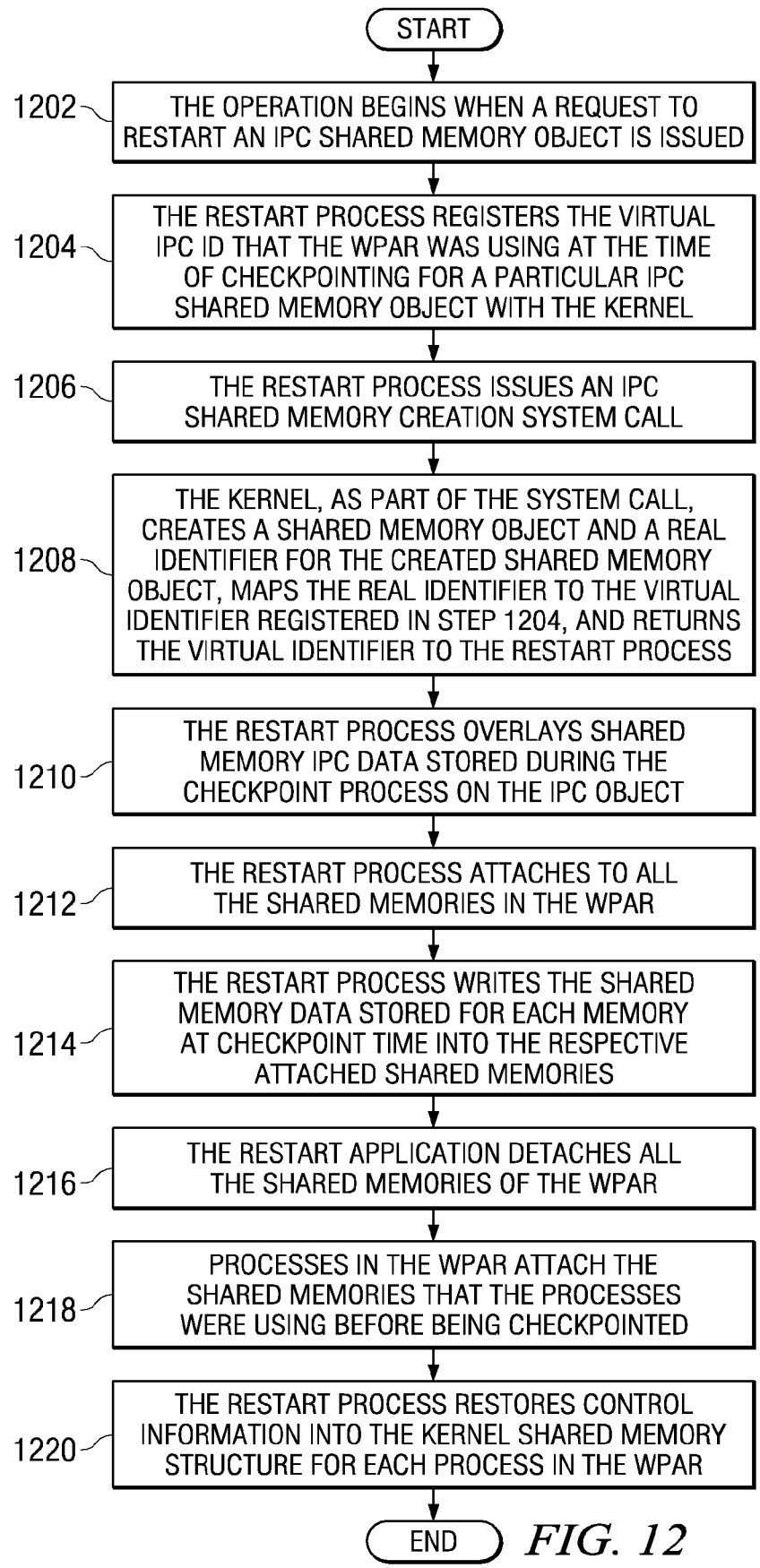
FIG. 12 is flowchart illustrating the operation of checkpointing an IPC shared memory object in accordance with an exemplary embodiment.

FIG. 12 is a flowchart illustrating the operation of restarting an IPC shared memory object in accordance with an exemplary embodiment. The operation of FIG. 12 may be performed by a restart process, such as restart process 324 in FIG. 3. FIG. 12 is expanded view of steps 508-516 of FIG. 5. The operation begins when a request to restart an IPC shared memory object is issued (step 1202). The restart process registers the virtual IPC ID that the WPAR was using at the time of checkpointing for a particular IPC shared memory object with the kernel (step 1204). The information is retrieved from the checkpoint data that was collected during the checkpoint process. The restart process issues an IPC shared memory creation system call (step 1206). The kernel, as part of the system call, creates a shared memory object and a real identifier for the created shared memory object, maps the real identifier to the virtual identifier registered in step 1204, and returns the virtual identifier to the restart process (step 1208). The restart process overlays shared memory IPC data stored during the checkpoint process on the IPC object (step 1210). The restart process attaches to all the shared memories in the WPAR (step 1212). The restart process writes the shared memory data stored for each memory at checkpoint time into the respective attached shared memories (step 1214). The respective shared memories are identified using the virtual IPC ID contained in the data structure. The restart application detaches all the shared memories of the WPAR (step 1216). Processes in the WPAR attach the shared memories that the processes were using before being checkpointed (step 1218). The restart process restores control information into the kernel shared memory structure for each process in the WPAR (step 1220), and the process ends.

Thus, various exemplary embodiments provide for the transparent migration of WPARs by virtualizing the IPC object identifiers used by the WPAR and then checkpointing and restarting the IPC objects.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for migrating a workload partition, the computer implemented method comprising:

responsive to receiving a request to checkpoint the workload partition on a first data processing system, generating, by a checkpoint process, a list of a set of virtual identifiers used by the workload partition to refer to a set of inter-process communication (IPC) objects, wherein each virtual identifier of the set of virtual identifiers corresponds to an IPC object of the set of IPC objects and to a real identifier used by a kernel that corresponds to the IPC object, wherein the list comprises all the virtual identifiers for at least one of IPC semaphore objects of the workload partition, IPC message queue objects of the workload partition, and IPC shared memory objects of the workload partition;

storing the list in a data repository;

storing attributes for each one of IPC semaphore objects, IPC message queue objects, and IPC shared memory objects on the list in a data structure;

collecting IPC object data and control information for each IPC object in the list, forming collected data;

storing the collected data in the data repository;

storing, by each process in the workload partition, per process data in the data repository;

responsive to receiving a request to restart the workload partition on a second data processing system, registering, by a restart process, the virtual identifier stored in the data repository that the workload partition wants to be used for a new IPC object to be created on the second data processing system to form a registered virtual identifier;

creating the new IPC object by a kernel on the second data processing system;

mapping, by the kernel, a real identifier used by the kernel associated with the new IPC object to the registered virtual identifier;

retrieving, by the restart process, the collected data from the data repository associated with the registered virtual identifier;

overlaying the collected data on the new IPC object; and restoring per process data from the data repository of each process in the workload partition.

2. The computer implemented method of claim 1, further comprising:
issuing a request, by the workload partition, to create an IPC object on the first data processing system;
responsive to receiving, by the kernel on the first data processing system, the request, creating an IPC object, forming a created IPC object and the real identifier for the created IPC object forming a real IPC identifier;
registering the real IPC identifier with the first data structure;
mapping the real IPC identifier to the virtual identifier belonging to the workload partition that issued the request; and
returning the virtual identifier to the workload partition that issued the request.

3. The computer implemented method of claim 1, wherein the IPC object is an IPC semaphore object;
wherein collecting IPC object data and control information for each IPC object in the list, forming collected data comprises:
collecting IPC object data and control information for each virtual identifier for each IPC semaphore object of the workload partition; and
writing the IPC object data and control information to the data structure, forming collected data; and
wherein storing, by each process in the workload partition, per process data in the data repository comprises storing save and undo information.

4. The computer implemented method of claim 3, further comprising:
wherein responsive to receiving the request to restart the workload partition on the second data processing system, registering, by the restart process, the virtual identifier stored in the data repository that the workload partition wants to be used for the new IPC object to be created on the second data processing system to form the registered virtual identifier comprises:
registering the virtual identifier that the workload partition was using for the IPC semaphore object at a time of checkpointing the workload partition on the first data processing system to form a registered virtual identifier;
wherein creating the new IPC object by a kernel on the second data processing system comprises:
issuing an IPC semaphore creation system call;
creating the new IPC semaphore object by the kernel and the real identifier used by the kernel for the new IPC semaphore object; and
storing the mapped identifiers in a second data structure.

5. The computer implemented method of claim 1, wherein the IPC object is an IPC message queue object;
wherein collecting IPC object data and control information for each IPC object in the list, forming collected data comprises:
retrieving and storing attributes for each IPC message queue object in the data structure;
collecting and storing data in the data structure, wherein the data comprises message queue permissions; current number of bytes on a message queue; current number of messages on the message queue; maximum number of bytes allowed on the message queue; process identifier of last process to send a message; process identifier of last process to receive a message; time of last message sent; time of last message received, the virtual identifier of the message queue used by the workload partition; and an identifier that identifies the workload partition using the virtual identifier;
storing each message in each message queue with the virtual identifier for the IPC message queue object used by the workload partition in the data structure; and
storing control information each message queue in the data structure.

6. The computer implemented method of claim 5, further comprising:
wherein responsive to receiving the request to restart the workload partition on the second data processing system, registering, by the restart process, the virtual identifier stored in the data repository that the workload partition wants to be used for the new IPC object to be created on the second data processing system to form the registered virtual identifier comprises:
registering the virtual identifier that the workload partition was using for the IPC message queue object at the time of checkpointing the workload partition on the first data processing system to form a registered virtual identifier;
wherein creating the new IPC object by a kernel on the second data processing system comprises:
issuing an IPC message queue creation system call;
creating the new IPC message queue object by the kernel and the real identifier used by the kernel for the new IPC message queue object;
storing the mapped identifiers in a second data structure; and
placing messages stored in the data repository into a corresponding message queue for each IPC message queue object.

7. The computer implemented method of claim 1, wherein the IPC object is an IPC shared memory object;
wherein collecting IPC object data and control information for each IPC object in the list, forming collected data comprises:
retrieving and storing attributes for each shared memory object in the data structure; and
collecting and storing data in the data structure forming stored data, wherein the data comprises a size of a shared memory segment; process identifier of a last shared memory operation; a process identifier of a creator of the workload partition; current number of attaches to a shared memory; in memory number of attached; last shared memory attachment time, last shared memory detachment time; last time the shared memory was changed; the virtual identifier of the IPC shared memory object used by the workload partition; and an identifier that identifies the workload partition using the virtual identifier.

8. The computer implemented method of claim 7, further comprising:
wherein responsive to receiving the request to restart the workload partition on the second data processing system, registering, by the restart process, the virtual identifier stored in the data repository that the workload partition wants to be used for the new IPC object to be created on the second data processing system to form the registered virtual identifier comprises:
registering the virtual identifier that the workload partition was using for the IPC shared memory object at the time of checkpointing the workload partition on the first data processing system to form a registered virtual identifier;

wherein creating the new IPC object by a kernel on the second data processing system comprises:
issuing an IPC shared memory creation system call; and
creating the new IPC shared memory object by the kernel and the real identifier used by the kernel for the new IPC shared memory object; and
wherein overlaying the collected data on the new IPC object comprises:
overlaying shared memory IPC data stored during the checkpoint process on the first data processing system on the new IPC shared memory object;
attaching, by the restart process, to all shared memories of the workload partition;
writing shared memory data stored for each memory at checkpoint time into the respective attached shared memories;
detaching, by the restart process, all the shared memories of the workload partition;
attaching, by each process in the workload partition, to the shared memories that each process was using prior to being checkpointed on the first data processing system; and
overlaying the and control information for the IPC shared memory object.

9. A computer program product for migrating a workload partition, the computer program product comprising:
a computer recordable storage medium having computer usable program code tangibly embodied thereon, the computer usable program code comprising:
computer usable program code for, responsive to receiving a request to checkpoint the workload partition on a first data processing system, generating, by a checkpoint process, a list of a set of virtual identifiers used by the workload partition to refer to a set of inter-process communication (IPC) objects, wherein each virtual identifier of the set of virtual identifiers corresponds to an IPC object of the set of IPC objects and to a real identifier used by a kernel that corresponds to the IPC object, wherein the list comprises all the virtual identifiers for at least one of IPC semaphore objects of the workload partition, IPC message queue objects of the workload partition, and IPC shared memory objects of the workload partition;
computer usable program code for storing the list in a data repository;
computer usable program code for storing attributes for each one of IPC semaphore objects, IPC message queue objects, and IPC shared memory objects on the list in a data structure
computer usable program code for collecting IPC object data and control information for each IPC object in the list, forming collected data;
computer usable program code for storing the collected data in the data repository;
computer usable program code for storing, by each process in the workload partition, per process data in the data repository;
computer usable program code for, responsive to receiving a request to restart the workload partition on a second data processing system, registering, by a restart process, the virtual identifier stored in the data repository that the workload partition wants to be used for a new IPC object to be created on the second data processing system to form a registered virtual identifier;
computer usable program code for creating the new IPC object by a kernel on the second data processing system;

computer usable program code for mapping, by the kernel, a real identifier used by the kernel associated with the new IPC object to the registered virtual identifier;
computer usable program code for retrieving, by the restart process, the collected data from the data repository associated with the registered virtual identifier;
computer usable program code for overlaying the collected data on the new IPC object; and
computer usable program code for restoring per process data from the data repository of each process in the workload partition.

10. The computer program product of claim 9, further comprising:
computer usable program code for issuing a request, by the workload partition, to create an IPC object on the first data processing system;
computer usable program code for, responsive to receiving, by the kernel on the first data processing system, the request, creating an IPC object, forming a created IPC object and the real identifier for the created IPC object forming a real IPC identifier;
computer usable program code for registering the real IPC identifier with the first data structure;
computer usable program code for mapping the real IPC identifier to the virtual identifier belonging to the workload partition that issued the request; and
computer usable program code for returning the virtual identifier to the workload partition that issued the request.

11. The computer program product of claim 9, wherein the IPC object is an IPC semaphore object;
wherein the list comprises all the virtual identifiers for IPC semaphore objects of the workload partition;
wherein the computer usable program code for collecting IPC object data and control information for each IPC object in the list, forming collected data comprises:
computer usable program code for collecting IPC object data and control information for each virtual identifier for each IPC semaphore object of the workload partition; and
computer usable program code for writing the IPC object data and control information to a data structure, forming collected data; and
wherein the computer usable program code for storing, by each process in the workload partition, per process data in the data repository comprises computer usable program code for storing save and undo information.

12. The computer program product of claim 11, wherein the computer usable program code for responsive to receiving the request to restart the workload partition on the second data processing system, registering, by the restart process, the virtual identifier stored in the data repository that the workload partition wants to be used for the new IPC object to be created on the second data processing system to form the registered virtual identifier comprises:
computer usable program code for registering the virtual identifier that the workload partition was using for the IPC semaphore object at a time of checkpointing the workload partition on the first data processing system to form a registered virtual identifier; and
wherein the computer usable program code for creating the new IPC object by a kernel on the second data processing system comprises:
computer usable program code for issuing an IPC semaphore creation system call;

computer usable program code for creating the new IPC semaphore object by the kernel and the real identifier used by the kernel for the new IPC semaphore object; and computer usable program code for storing the mapped identifiers in a second data structure.

13. The computer program product of claim 9, wherein the IPC object is an IPC message queue object;

wherein the list comprises all the virtual identifiers for IPC message queue objects of the workload partition; and wherein the computer usable program code for collecting IPC object data and control information for each IPC object in the list, forming collected data comprises:

computer usable program code for retrieving and storing attributes for each IPC message queue object in a data structure;

computer usable program code for collecting and storing data in the data structure, wherein the data comprises message queue permissions; current number of bytes on a message queue; current number of messages on the message queue; maximum number of bytes allowed on the message queue; process identifier of last process to send a message; process identifier of last process to receive a message; time of last message sent; time of last message received, the virtual identifier of the message queue used by the workload partition; and an identifier that identifies the workload partition using the virtual identifier;

computer usable program code for storing each message in each message queue with the virtual identifier for the IPC message queue object used by the workload partition in the data structure; and computer usable program code for storing control information each message queue in the data structure.

14. The computer program product of claim 13, wherein the computer usable program code for, responsive to receiving the request to restart the workload partition on the second data processing system, registering, by the restart process, the virtual identifier stored in the data repository that the workload partition wants to be used for the new IPC object to be created on the second data processing system to form the registered virtual identifier comprises:

computer usable program code for registering the virtual identifier that the workload partition was using for the IPC message queue object at the time of checkpointing the workload partition on the first data processing system to form a registered virtual identifier;

wherein the computer usable program code for creating the new IPC object by a kernel on the second data processing system comprises:

computer usable program code for issuing an IPC message queue creation system call;

computer usable program code for creating the new IPC message queue object by the kernel and the real identifier used by the kernel for the new IPC message queue object;

computer usable program code for storing the mapped identifiers in a second data structure; and computer usable program code for placing messages stored in the data repository into a corresponding message queue for each IPC message queue object.

15. The computer program product of claim 9, wherein the IPC object is an IPC shared memory object;

wherein the list comprises all the virtual identifiers for IPC shared memory objects of the workload partition; and wherein the computer usable program code for collecting IPC object data and control information for each IPC object in the list, forming collected data comprises:

computer usable program code for retrieving and storing attributes for each shared memory object in a data structure; and computer usable program code for collecting and storing data in the data structure forming stored data, wherein the data comprises a size of a shared memory segment; process identifier of a last shared memory operation; a process identifier of a creator of the workload partition; current number of attaches to a shared memory; in memory number of attached; last shared memory attachment time, last shared memory detachment time; last time the shared memory was changed; the virtual identifier of the IPC shared memory object used by the workload partition; and an identifier that identifies the workload partition using the virtual identifier.

16. The computer program product of claim 15, further comprising:

wherein the computer usable program code for, responsive to receiving the request to restart the workload partition on the second data processing system, registering, by the restart process, the virtual identifier stored in the data repository that the workload partition wants to be used for the new IPC object to be created on the second data processing system to form the registered virtual identifier comprises:

computer usable program code for registering the virtual identifier that the workload partition was using for the IPC shared memory object at a time of checkpointing the workload partition on the first data processing system to form a registered virtual identifier;

wherein the computer usable program code for creating the new IPC object by a kernel on the second data processing system comprises:

computer usable program code for issuing an IPC shared memory creation system call;

computer usable program code for creating the new IPC shared memory object by the kernel and the real identifier used by the kernel for the new IPC shared memory object; and wherein the computer usable program code for overlaying the collected data on the new IPC object comprises:

computer usable program code for overlaying shared memory IPC data stored during the checkpoint process on the first data processing system on the new IPC shared memory object;

computer usable program code for attaching, by the restart process, to all shared memories of the workload partition;

computer usable program code for writing shared memory data stored for each memory at checkpoint time into the respective attached shared memories;

computer usable program code for detaching, by the restart process, all the shared memories of the workload partition;

computer usable program code for attaching, by each process in the workload partition, to the shared memories that each process was using prior to being checkpointed on the first data processing system; and computer usable program code for overlaying the and control information for the IPC shared memory object.

17. A data processing system for migrating a workload partition, the data processing system comprising:

a bus;

a storage device connected to the bus, wherein the storage device contains computer usable code; and a processing unit connected to the bus, wherein the processing unit executes the computer usable code to:

responsive to receiving a request to checkpoint the workload partition on a first data processing system, generate, by a checkpoint process, a list of a set of virtual identifiers used by the workload partition to refer to a set of inter-process communication (IPC) objects, wherein each virtual identifier of the set of set of virtual identifiers corresponds to an IPC object of the set of IPC objects and to a real identifier used by a kernel that corresponds to the IPC object, wherein the list comprises all the virtual identifiers for at least one of IPC semaphore objects of the workload partition, IPC message queue objects of the workload partition, and IPC shared memory objects of the workload partition;

store the list in a data repository;

store attributes for each one of IPC semaphore objects, IPC message queue objects, and IPC shared memory objects on the list in a data structure;

collect IPC object data and control information for each IPC object in the list, forming collected data;

store the collected data in the data repository;

store, by each process in the workload partition, per process data in the data repository;

responsive to receiving a request to restart the workload partition on a second data processing system, register, by a restart process, the virtual identifier stored in the data repository that the workload partition wants to be used for a new IPC object to be created on the second data processing system to form a registered virtual identifier;

create the new IPC object by a kernel on the second data processing system;

map, by the kernel, a real identifier used by the kernel associated with the new IPC object to the registered virtual identifier;

retrieve, by the restart process, the collected data from the data repository associated with the registered virtual identifier;

overlay the collected data on the new IPC object;

restore per process data from the data repository each process in the workload partition.

18. The data processing system of claim 17, wherein the processing unit further executes the computer usable code to:

issue a request, by the workload partition, to create an IPC object on the first data processing system;

responsive to receiving, by the kernel on the first data processing system, the request, create an IPC object, forming a created IPC object and the real identifier for the created IPC object forming a real IPC identifier;

register the real IPC identifier with the first data structure;

map the real IPC identifier to the virtual identifier belonging to the workload partition that issued the request; and return the virtual identifier to the workload partition that issued the request.

19. The data processing system of claim 17, wherein the IPC object is an IPC semaphore object;

wherein the processing unit executing the computer usable code to collect IPC object data and control information for each IPC object in the list, forming collected data comprises the processing unit executing the computer usable code to:

collect IPC object data and control information for each virtual identifier for each IPC semaphore object of the workload partition; and write the IPC object data and control information to a data structure, forming collected data;

wherein the processing unit executing the computer usable code to store, by each process in the workload partition, per process data in the data repository comprises the processor executing the computer usable code to store save and undo information;

wherein the processing unit executing the computer usable code to, responsive to receiving the request to restart the workload partition on the second data processing system, register, by the restart process, the virtual identifier stored in the data repository that the workload partition wants to be used for the new IPC object to be created on the second data processing system to form the registered virtual identifier comprises the processing unit executing the computer usable code to:

register the virtual identifier that the workload partition was using for the IPC semaphore object at the time of checkpointing the workload partition on the first data processing system to form a registered virtual identifier; and wherein the processing unit executing the computer usable code to create the new IPC object by a kernel on the second data processing system comprises the processing unit executing the computer usable code to:

issue an IPC semaphore creation system call;

create the new IPC semaphore object by the kernel and the real identifier used by the kernel for the new IPC semaphore object; and store the mapped identifiers in a second data structure.

20. The data processing system of claim 17, wherein the IPC object is an IPC message queue object;

wherein the processing unit executing the computer usable code to collect IPC object data and control information for each IPC object in the list, forming collected data comprises the processing unit further executing the computer usable code to:

retrieve and store attributes for each IPC message queue object in a data structure;

collect and store data in the data structure, wherein the data comprises message queue permissions; current number of bytes on a message queue; current number of messages on the message queue; maximum number of bytes allowed on the message queue; process identifier of last process to send a message; process identifier of last process to receive a message; time of last message sent; time of last message received, the virtual identifier of the message queue used by the workload partition; and an identifier that identifies the workload partition using the virtual identifier;

store each message in each message queue with the virtual identifier for the IPC message queue object used by the workload partition in the data structure; and store control information for each message queue in the data structure;

wherein the processing unit executing the computer usable code to, responsive to receiving the request to restart the workload partition on the second data processing system, register, by the restart process, the virtual identifier stored in the data repository that the workload partition wants to be used for the new IPC object to be created on the second data processing system to form the registered virtual identifier comprises the processing unit further executing the computer usable code to:

register the virtual identifier that the workload partition was using for the IPC message queue object at a time of checkpointing the workload partition on the first data processing system to form a registered virtual identifier; and wherein the processing unit executing the computer usable code to create the new IPC object by a kernel on the second data processing system comprises the processing unit further executing the computer usable code to:

issue an IPC message queue creation system call;

create the new IPC message queue object by the kernel and the real identifier used by the kernel for the new IPC message queue object;

store the mapped identifiers in a second data structure; and place messages stored in the data repository into a corresponding message queue for each IPC message queue object.

* * * * *